(12) United States Patent
Sawaoka

(10) Patent No.: US 10,023,055 B2
(45) Date of Patent: Jul. 17, 2018

(54) MOTOR CONTROL DEVICE AND MOTOR CONTROL METHOD

(71) Applicant: DENSO CORPORATION, Kariya, Aichi-pref. (JP)

(72) Inventor: Hideo Sawaoka, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/508,528

(22) PCT Filed: Sep. 14, 2015

(86) PCT No.: PCT/JP2015/004653
§ 371 (c)(1),
(2) Date: Mar. 3, 2017

(87) PCT Pub. No.: WO2016/047081
PCT Pub. Date: Mar. 31, 2016

(65) Prior Publication Data
US 2017/0274781 A1     Sep. 28, 2017

(30) Foreign Application Priority Data
Sep. 24, 2014   (JP) .................................. 2014-193725

(51) Int. Cl.
*B60L 11/18* (2006.01)
*H02P 6/08* (2016.01)
(Continued)

(52) U.S. Cl.
CPC .......... *B60L 11/1807* (2013.01); *H02P 6/085* (2013.01); *H02P 6/17* (2016.02); *H02P 6/18* (2013.01); *H02P 6/28* (2016.02)

(58) Field of Classification Search
CPC ........ B60L 11/1807; H02P 6/17; H02P 6/085; H02P 6/28; H02P 6/18; H02P 1/50;
(Continued)

(56) References Cited

U.S. PATENT DOCUMENTS 6,424,798 B1  7/2002  Kitamine
2011/0260671 A1*  10/2011  Jeung ....................... H02P 6/08
                                                         318/701
(Continued)

FOREIGN PATENT DOCUMENTS

JP        2015-076992 A        4/2015

*Primary Examiner* — Kawing Chan
*Assistant Examiner* — Bradley Brown
(74) *Attorney, Agent, or Firm* — Posz Law Group, PLC

(57) ABSTRACT

A rotational speed command output unit receives and outputs a command value of a motor rotational speed inputted from outside. A PWM duty calculator calculates a PWM duty based on the command value and an actual rotational speed of a motor. A maximum speed estimator estimates, based on the actual rotational speed measured, a parameter representing a controlled state of the motor, a current PWM duty and a predetermined upper limit of the PWM duty, a maximum rotational speed of the motor to be reached under PWM control with the upper limit of the PWM duty. The command value inputted from outside is restricted not to exceed the maximum rotational speed. In this way, when a motor is PWM-controlled, abrupt changes in the rotational speed of the motor due to supply voltage fluctuations can be suppressed.

11 Claims, 6 Drawing Sheets

(51) Int. Cl.
*H02P 6/28* (2016.01)
*H02P 6/17* (2016.01)
*H02P 6/18* (2016.01)

(58) Field of Classification Search
CPC ... H02P 1/46; H02J 3/42; H02K 17/26; H02K 19/12
USPC .......................................................... 318/715
See application file for complete search history.

(56) References Cited

U.S. PATENT DOCUMENTS

| | | | | |
|---|---|---|---|---|
| 2013/0069575 A1* | 3/2013 | Hano | ..................... | H02P 6/165 318/400.34 |
| 2013/0221882 A1* | 8/2013 | Gu | ........................... | H02P 6/08 318/400.13 |

* cited by examiner

MOTOR CONTROL DEVICE AND MOTOR CONTROL METHOD

CROSS REFERENCE TO RELATED APPLICATIONS

This application is a U.S. national stage of International Patent Application No. PCT/JP2015/004653 filed on Sep. 14, 2015 and is based on Japanese Patent Application No. 2014-193725 filed on Sep. 24, 2014, the disclosures of which are incorporated herein by reference.

TECHNICAL FIELD

The present disclosure relates to a motor control device and a motor control method which PWM-controls a motor by calculating a PWM signal duty based on a command value for a motor rotational speed inputted from outside and an actual motor rotational speed measured.

BACKGROUND ART

The rotational speed of a permanent magnet type motor, for example, a brushless DC motor is dependent on the current supplied to the stator windings of the motor and the magnetic force and impedance of the motor. In a configuration in which the motor is PWM (Pulse Width Modulation) controlled using an inverter circuit, when the voltage supplied to the inverter circuit varies in a state where, with the PWM duty having reached 100%, the rotational speed of the motor is lower than a rotational speed command value, the current supplied to the motor varies and the rotational speed of the motor fluctuates. Namely, the rotational speed of the motor fluctuates due to fluctuations of the supply voltage itself or noise superimposed on the supply voltage.

Generally, when a motor is PWM-controlled, feedback control is performed so as to have a PWM duty determined based on the difference between a given rotational speed command and a detected rotational speed of the motor. In such a control system, however, when the PWM duty reaches 100% whereas the rotational speed of the motor has not reached the rotational speed command value, the rotational speed cannot be further increased and rotational speed control becomes impossible. Technique addressing such an issue is disclosed, for example, in Patent Literature 1.

PRIOR ART LITERATURE

Patent Literature

Patent Literature 1: JP 4154635 B2

SUMMARY OF INVENTION

In Patent Literature 1, when the PWM duty reaches 100%, the speed command value is replaced by a value equivalent to the current rotational speed. However, changing the command value when the PWM duty reaches 100% delays the control response. Also, when the rotational speed rapidly increases before the PWM duty reaches 100%, rotational speed changes are suppressed by feedback control only. Therefore, when the motor is, for example, for driving a fan, wind pressure may abruptly change or abnormal drive sound may be generated or when the motor is, for example, for driving a pump, the pressure feed may become excessive.

An object of the present disclosure is to provide a motor control device and a motor control method which, in PWM-controlling a motor, can suppress abrupt changes in the rotational speed of the motor due to supply voltage fluctuations.

According to a first aspect of the present disclosure, a motor control device includes a rotational speed command output unit, a motor rotational speed meter, a PWM duty calculator and a maximum speed estimator. The rotational speed command output unit receives and outputs a command value of a rotational speed of a motor inputted from outside. The motor rotational speed meter measures an actual rotational speed of the motor. The PWM duty calculator calculates a PWM duty based on the command value and the actual rotational speed of the motor measured. The maximum speed estimator estimates, based on the actual rotational speed measured, a parameter representing a controlled state of the motor and a predetermined upper limit of the PWM duty, a maximum rotational speed of the motor to be reached under PWM control with the upper limit of the PWM duty. The command value inputted from outside is restricted not to exceed the maximum rotational speed.

For example, when, in a state in which the motor is running at a rotational speed corresponding to a command value inputted from outside, the supply voltage for driving drops in the drive circuit, the motor rotational speed correspondingly decreases. As a result, the maximum rotational speed estimated by the maximum speed estimator also decreases. When the command value is unchanged, the command value exceeds the maximum rotational speed in due course. In this state, when the rotational speed command output unit restricts the command value not to exceed the maximum rotational speed and PWM control is continued with the upper limit of the PWM duty, the rotational speed of the motor is controlled to be equal to the estimated maximum rotational speed.

Subsequently, when the supply voltage for driving returns to a previous level, the rotational speed of the motor correspondingly increases causing the maximum rotational speed estimated by the maximum speed estimator to also increase. Subsequently, when the estimated maximum rotational speed exceeds the command value, the PWM duty again starts being calculated based on the command value. As a result, the rotational speed of the motor again starts being corresponding to the command value. In this way, abrupt changes in the rotational speed of the motor due to supply voltage fluctuations can be suppressed.

According to a second aspect of the present disclosure, in the motor control device, the maximum rotational speed estimator estimates the maximum rotational speed of the motor based on a current PWM duty as the parameter representing the controlled state of the motor and using the following formula:

$$(\text{Rotational speed})/(\text{current PWM duty}) \times (\text{upper limit of PWM duty}).$$

Namely, the rotational speed of the motor is proportional to the PWM duty, so the maximum rotational speed can be appropriately estimated.

According to a third aspect of the present disclosure, a motor control method includes: calculating a PWM duty of a PWM signal based on a command value of a rotational speed of a motor inputted from outside and a measured rotational speed of the motor; based on the measured rotational speed, a parameter representing a controlled state of the motor and a predetermined upper limit of the PWM duty, estimating a maximum rotational speed of the motor to be reached under PWM control with the upper limit of the PWM duty; and restricting the command value inputted from outside to a value equal to or smaller than the maximum rotational speed.

In this way as in the foregoing way, abrupt changes in the rotational speed of the motor due to supply voltage fluctuations can be suppressed.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

Figure 4:
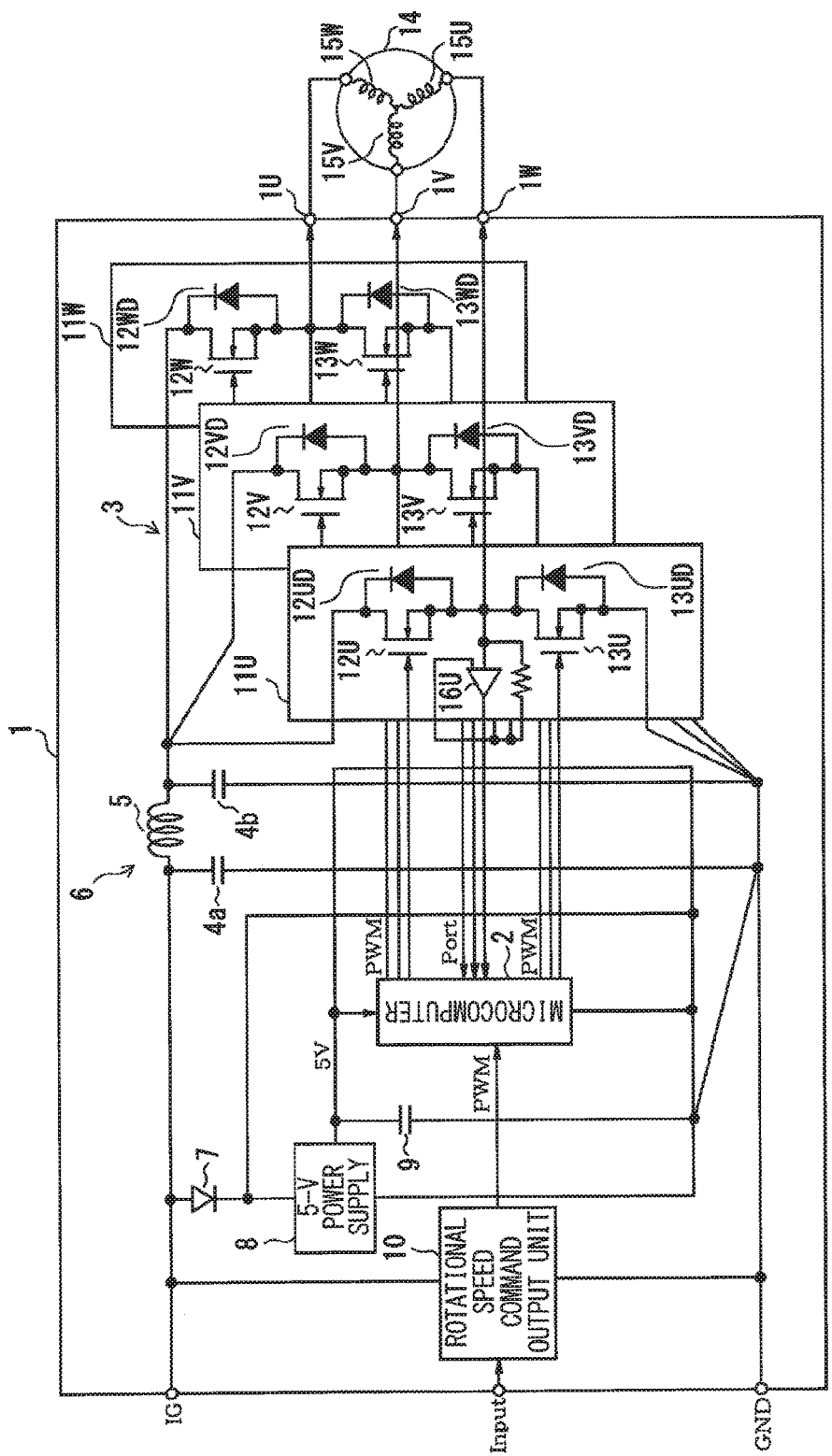
FIG. 4 is a diagram showing an overall configuration of the motor drive control device.

For example, as shown in FIG. 4, an in-vehicle motor drive control device 1 is configured centering around a microcomputer (control circuit) 2 and an inverter circuit 3. The motor drive control device 1 is supplied with drive power via an ignition switch (IG) of a vehicle. The drive power is supplied to the inverter circuit 3 (drive circuit) via a π-type filter 6 including capacitors 4a and 4b and a coil 5.

The drive power is also supplied to a 5-V power supply circuit 8 via a diode 7. The 5-V power supply circuit 8 generates 5-V control power by stepping down the drive power supply voltage and supplies the 5-V control power to the power supply terminal of the microcomputer 2. A bypass capacitor 9 is connected between the power supply terminal of the microcomputer 2 and ground. A rotational speed command output unit 10 receives from a higher-order control device, not shown, a low-speed PWM signal representing a motor rotational speed command. Based on the value (PWM duty) of the inputted PWM command, the rotational speed command output unit 10 generates a higher-speed PWM signal and outputs the generated higher-speed PWM signal to an input port of the microcomputer 2.

The inverter circuit 3 includes three element modules 11U, 11V and 11W. The element modules 11U, 11V and 11W (hereinafter "11") each have a pair of series-connected N-channel MOSFETs (switching elements) 12U. 12V and 12W (hereinafter "12") and 13U, 13V and 13W (hereinafter "13"). Between the drains and sources of the FETs 12 and 13, free wheel diodes (parasitic diodes) 12UD, 12VD, 12WD, 13UD, 13VD and 13WD (hereinafter "12D" and "13D") are connected, respectively. The common connection points of the FETs 12 and 13 are connected, as the respective phase output terminals of the inverter circuit 3, to, for example, the stator windings 15U, 15V and 15W of the respective phases of a motor 14 which is a three-phase brushless DC motor via output terminals 1U, 1V and 1W of the motor drive control device 1. The microcomputer 2 (PWM signal output unit) with an internal CPU being operated by a control program (software) outputs PWM signals to the gates of the N-channel MOSFETs 12 and 13 making up the inverter circuit 3 and, thereby, drives and controls the motor 14.

The element modules 11 have terminal voltage comparators 16 (in FIG. 4, only a U-phase terminal voltage comparator 16U is shown) which compare the potentials of the common connection points of the FETs 12 and 13 with an equivalent neutral-point potential (sum of the voltages of the respective phases). The terminal voltage comparators 16 are used by the microcomputer 2 to detect zero-crossing points of the induced voltages of the motor 14. The equivalent neutral-point potential is supplied by a neutral-point voltage generator 17 shown in FIG. 1. The output signals of the comparators 16 included in the element modules 11 are respectively inputted to input ports of the microcomputer 2.

The microcomputer 2 detects, by referring to the output signals of the terminal voltage comparators 16 (U, V, W) received at input ports, zero-crossing points of the voltages induced in the stator windings 15U, 15V and 15W when the motor 14 is running.

Figure 3:
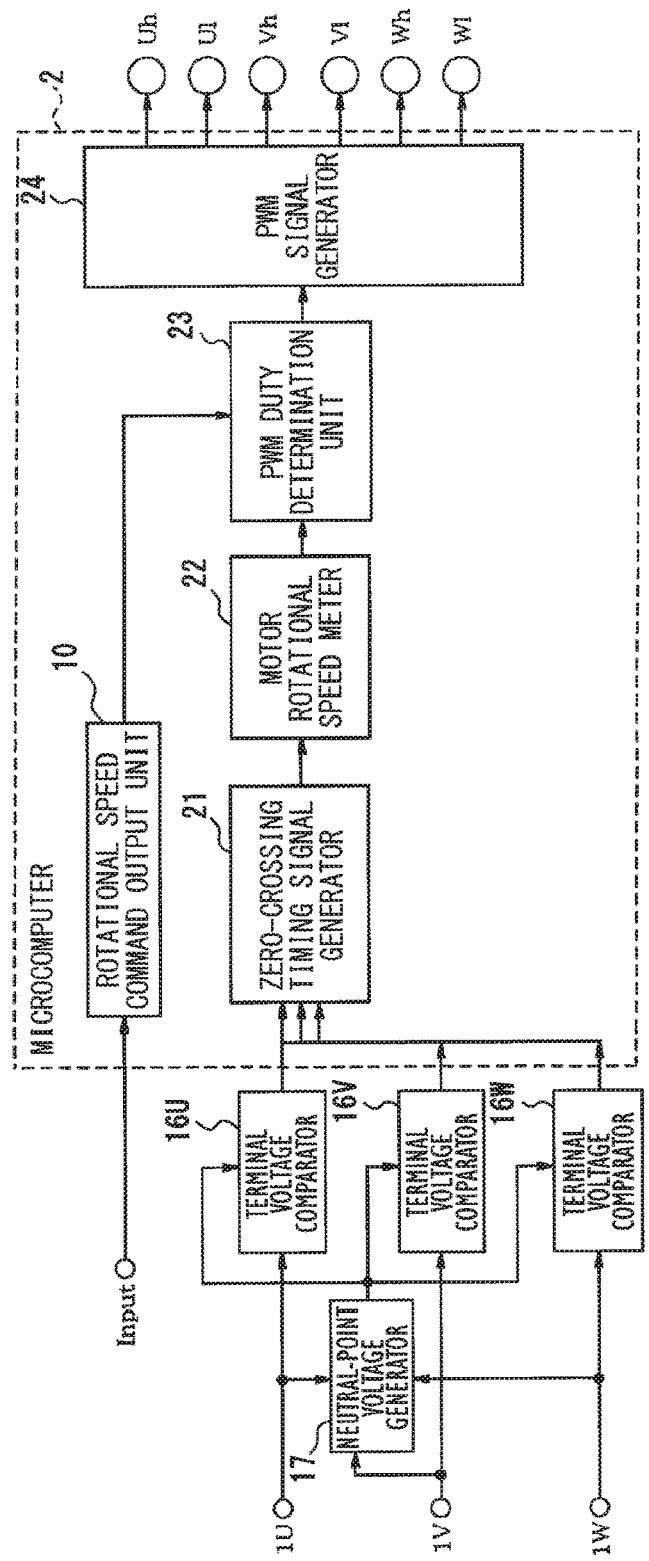
FIG. 3 is a functional block diagram centering on the processing function of a microcomputer included in the motor drive control device.

As shown in FIG. 3, a zero-crossing timing signal generator 21 included in the microcomputer 2 receives the output signals of the terminal voltage comparators 16 (U, V, W), generates square-wave timing signals whose rising edges and falling edges represent zero-crossing points of the U, V and W phases, and outputs the generated timing signals of the respective phases. The timing signals are inputted to a rotational speed meter 22.

The rotational speed meter 22 measures the actual rotational speed of the motor 14 by measuring the edge intervals of the zero-crossing timing signals and outputs the measurement results to a PWM duty determination unit 23. The PWM duty determination unit 23 being provided with a command value (rotational speed command) via the rotational speed command output unit 10 calculates a PWM duty command based on the difference between the command value and the actual rotational speed of the motor 14 measured by the motor rotational speed meter 22 and outputs the PWM duty command to a PWM signal generator 24.

The PWM signal generator 24 generates PWM signals based on carriers internally generated for PWM control and the duty command and outputs the PWM signals of phases U, V and W in accordance with energized-phase switching signals. For example, square-wave driving is performed by a 120-degree energization method. Specifically, the switching element on the upper-arm side is turned on and kept on for a 120-degree period, then the switching element on the upper-arm side is turned off; then, a 60-degree period later, the switching element on the lower arm side is turned on and kept on for a 120-degree period, then the switching element on the lower arm side is turned off; and, a 60-degree period later, the switching element on the upper arm side is turned on. This process is repeated. The carrier frequency in PWM control is, for example, about 20 kHz.

Figure 1:
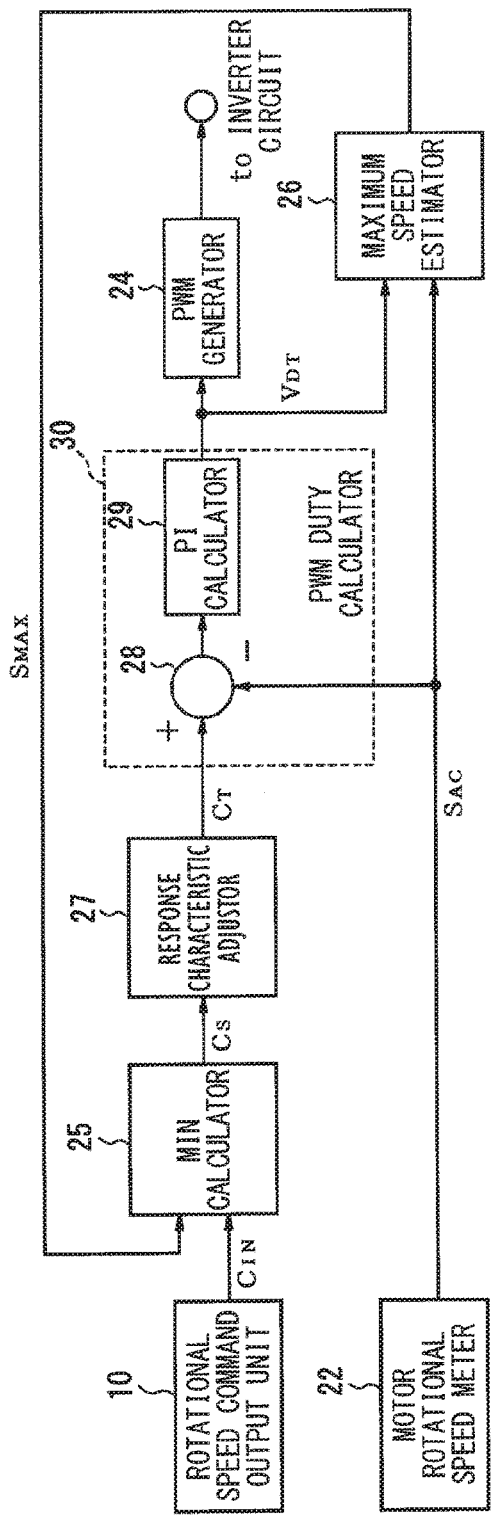
FIG. 1 is a functional block diagram showing the configuration of a PWM duty determination unit of a motor drive control device according to a first embodiment of the present disclosure.

As shown in FIG. 1, the PWM duty determination unit 23 includes a MIN calculator 25. The MIN calculator 25 compares a command value ($C_{IN}$) inputted from the rotational speed command output unit 10 and an estimated maximum rotational speed ($S_{MAX}$) inputted from a maximum speed estimator 26, being described later, selects the smaller one of the two and outputs the smaller value as a restricted command value ($C_S$) to a response characteristic adjustor 27. The response characteristic adjustor 27 adjusts the received command value so as to slow down the command value change response and outputs the adjusted command value as a target value ($C_T$) to a subtractor 28. The MIN calculator 25 and the response characteristic adjustor 27 make up, for example, a command value restriction unit.

The subtractor 28 outputs the difference between the received target value and the rotational speed (actual rotational speed $S_{AC}$) of the motor 14 measured by the motor rotational speed meter 22 to a PI calculator 29. The PI calculator 29 calculates a PWM duty ($V_{DT}$) by making PI (Proportional-Integral) control calculation on the received speed deviation value and outputs the calculated PWM duty to the PWM signal generator 24 and the maximum speed estimator 26. The subtractor 28 and the PI calculator 29 make up a PWM duty calculator 30.

The actual rotational speed measured by the rotational speed meter 22 is also inputted to the maximum speed estimator 26. The maximum speed estimator 26 has information on a predetermined upper limit (e.g. 100%) of the duty for PWM control. Based on the current PWM duty value received, the actual rotational speed of the motor 14 and the above upper limit duty, the maximum speed estimator 26 estimates a maximum rotational speed to be reached when the motor 14 is PWM-controlled with the upper limit duty and outputs the estimated maximum rotational speed to the MIN calculator 25.

Figure 2:
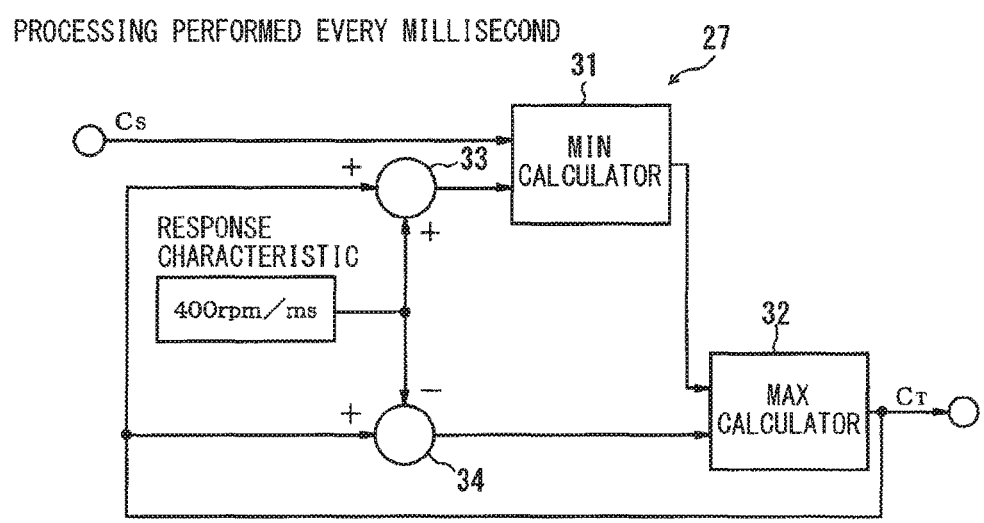
FIG. 2 is a functional block diagram showing the configuration of a response characteristic adjustor.

As shown in FIG. 2, the response characteristic adjustor 27 outputs the restricted command value received from the MIN calculator 25 to the next-stage subtractor 28 as a target value via a MIN calculator 31 and a MAX calculator 32. The target value is inputted to an adder 33 and a subtractor 34. The adder 33 outputs the target value added to by 400 rpm every control period, i.e., every millisecond to the MIN calculator 31. The subtractor 34 outputs the target value subtracted by 400 rpm every millisecond to the MAX calculator 32.

Namely, when, in a state in which no (restricted) command value is received with the target value being 0 rpm, the response characteristic adjustor 27 receives a command value of, for example, 10,000 rpm, the adder 33 adds, to 0 rpm, 400 rpm every millisecond and outputs the addition result to the MIN calculator 31. The addition result repeatedly increases from 400 rpm to 800 rpm, then to 1200 rpm, and so on. Until 10,000 rpm is exceeded, the addition result is selected for output from the MIN calculator 31.

At this time, the subtraction result inputted from the subtractor 34 to the MAX calculator 32 is 400-rpm smaller than the value outputted from the MIN calculator 31, so that the MAX calculator 32 selects, as a target value, the output of the MIN calculator 31.

Figure 5:
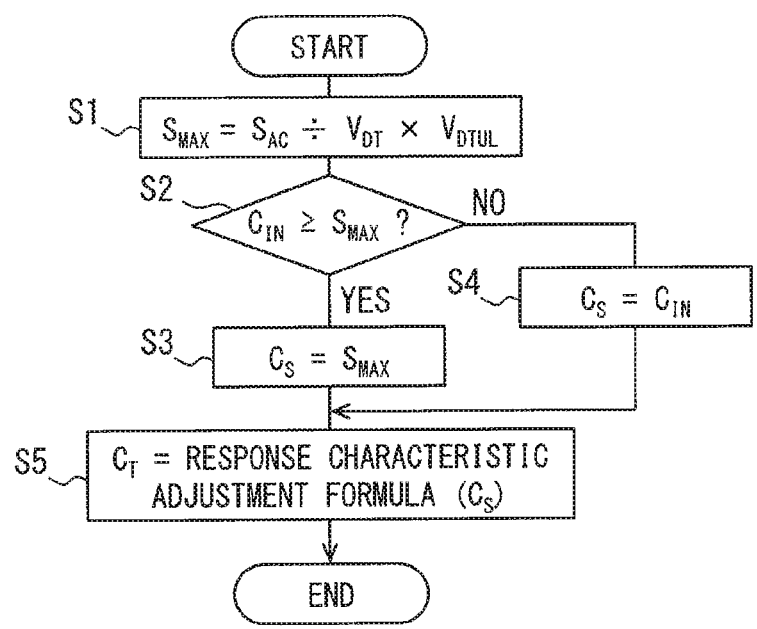
FIG. 5 is a flowchart showing the contents of processing performed by the PWM duty determination unit.

Next, the operation of this embodiment will be described. As shown in FIG. 5, the maximum speed estimator 26 estimates the maximum rotational speed by the following formula (S1):

(Actual rotational speed)/(PWM duty)×(upper limit of PWM duty)

The MIN calculator 25 determines whether or not the command value inputted from the rotational speed command output unit 10 is equal to or greater than the maximum rotational speed (S2). When the command value is smaller than the maximum rotational speed (NO), the command value inputted from the rotational speed command output unit 10 is made a restricted command (S4). In this case, the command value is, though not really restricted, referred to as a "restricted command value" for the sake of convenience. Also, in FIG. 5, $V_{DTUL}$ represents an upper limit of the PWM duty.

When, in step S2, the command value is determined to be equal to or greater than the maximum rotational speed (YES), the estimated maximum rotational speed is made as a restricted command value (S3). After steps S3 and S4 are executed, processing advances to step S5 and the restricted command value is outputted as a target value to the subtractor 28 via the response characteristic adjustor 27.

The above processing will be described using concrete numerical numbers. Assume, for example, with the maximum rotational speed estimated in step S1 being 10,000 rpm, the command value is changed from 9,000 rpm (duty 90%) to 12,000 rpm. When the response characteristic is 1,000 rpm/s, the actual rotational speed of the motor 14 reaches the estimated maximum rotational speed of 10,000 rpm in one second. In this case, setting the restricted command value to 10,000 rpm suppresses rising of the actual rotational speed. Thereafter, when the estimated maximum rotational speed changes to 12,000 rpm, the rotational speed of the motor 14 rises in the range of the above response characteristic, and the actual rotational speed reaches 12,000 rpm in two seconds.

Figure 6A:
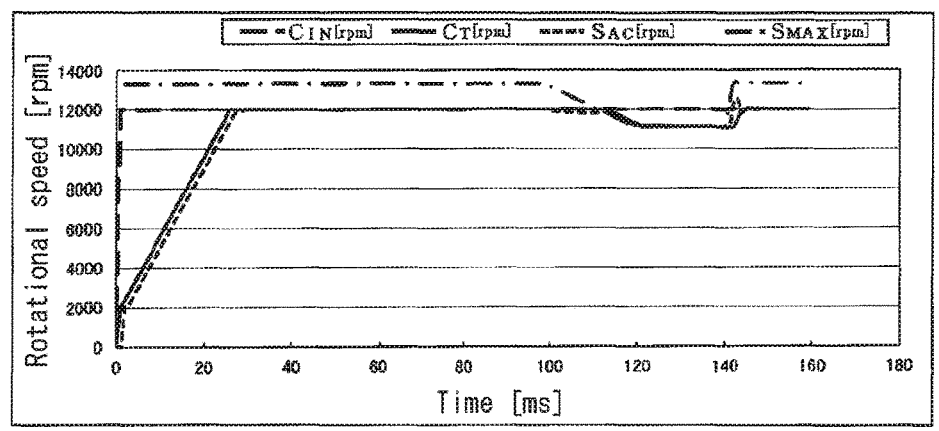
FIG. 6A is an operation timing chart.
Figure 6B:
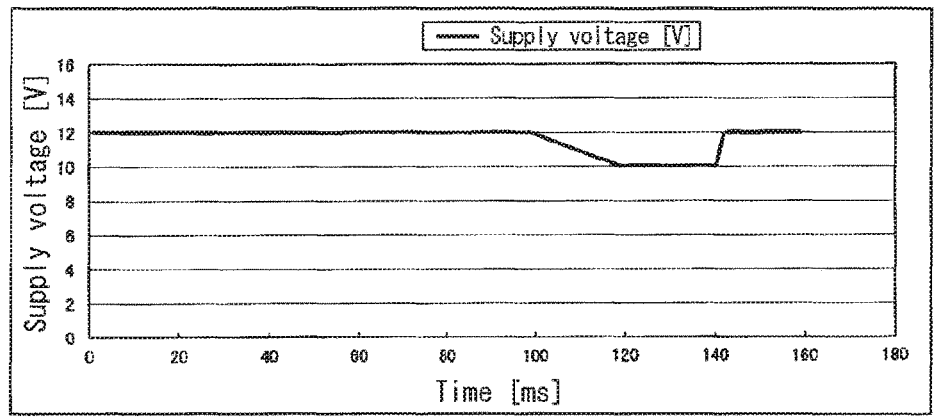
FIG. 6B is a supply voltage timing chart.
Figure 6C:
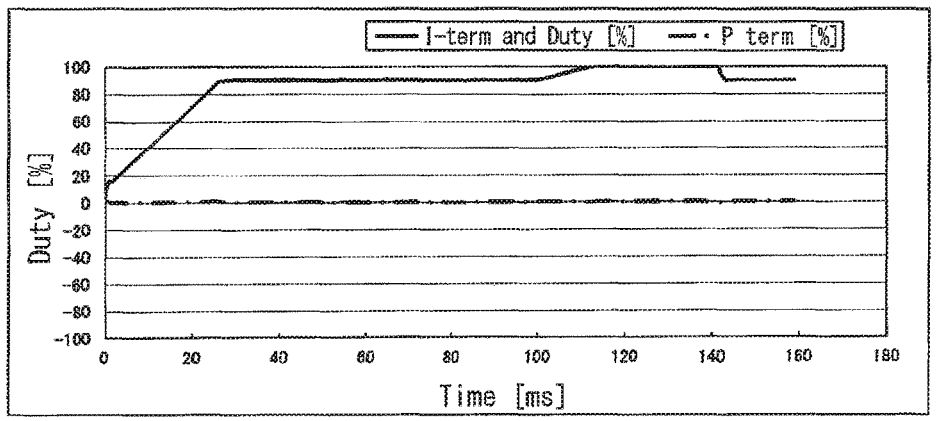
FIG. 6C is a timing chart of I-term gain and PWM duty in PI control calculation.

In the examples shown in FIGS. 6A to 6C, the initial value of the PWM duty is 15%, the response characteristic is 400 rpm/ms and, in the PI calculator 29, the P-term gain is 0.05% and I-term gain is 0.5%. When a command value of 12,000 rpm is inputted at time 0 ms, the target value and actual rotational speed rise according to the response characteristic 400 rpm/ms to coincide with the command value 12,000 rpm after 20 ms. At this time, the maximum rotational speed estimated by the maximum speed estimator 26 remains constant at 13,000 rpm plus.

As shown in FIG. 6B, at time 100 ms, the supply voltage starts dropping from the initial value of 12 V down to 10 V at time 120 ms. At this time, the actual rotational speed of the motor also decreases as shown in FIG. 6A. As a result, the estimated maximum rotational speed also decreases, causing the command value to exceed the maximum rotational speed at around time 110 ms. When, at this time, the MIN calculator 25 restricts the command value not to exceed the maximum rotational speed and PWM control is continued with an upper limit of the PWM duty, the rotational speed of the motor 14 is controlled to be equal to the estimated maximum rotational speed of 11,000 rpm plus.

When the supply voltage returns to 12 V at time 140 ms, the rotational speed of the motor 14 increases, causing the estimated maximum rotational speed to also increase. When the command value subsequently decreases to below the maximum rotational speed, the PWM duty again starts being calculated based on the command value and the actual rotational speed of the motor 14 returns to a speed corresponding to the command value. The PWM duty shown in FIG. 6C changes in the same manner as the I-term gain.

As described above, according to the present embodiment, the rotational speed command output unit 10 receives a command value of a motor rotational speed inputted from outside and outputs the received command value. The PWM duty calculator 30 calculates a PWM duty based on the command value and the actual rotational speed of the motor 14 measured. Based on the actual rotational speed measured, a parameter representing the controlled state of the motor 14, the current PWM duty and a preset upper limit of the PWM duty, the maximum speed estimator 26 estimates a maximum rotational speed of the motor 14 to be reached under PWM control with the upper limit of the PWM duty. The command value inputted from outside is then restricted not to exceed the maximum rotational speed. In this way, the rotational speed of the motor 14 is restricted from sharply changing when the supply voltage fluctuates.

The maximum speed estimator estimates the maximum rotational speed of the motor 14 using the current PWM duty as a parameter representing the controlled state of the motor 14 as follows, $$(\text{Rotational speed})/(\text{current PWM duty}) \times (\text{upper limit of PWM duty})$$

Namely, since the rotational speed of the motor 14 is proportional to the PWM duty, the maximum rotational speed can be appropriately estimated by the above formula.

Also, with the response characteristic adjustor 27 provided, the command value outputted from the rotational speed command output unit 10 is adjusted so as to make changing of the command value gentle. Therefore, when there is a large difference between the actual rotational speed of the motor 14 and the command value, the rotational speed can be restricted from sharply changing. In other words, the response characteristic adjustor 27 adjusts the command value outputted from the rotational speed output unit 10 so as not to allow the command value to change at a speed exceeding a predetermined value. In this way, when there is a large difference between the actual rotational speed of the motor 14 and the command value, the motor rotational speed can be restricted from sharply changing. Furthermore, since the PWM duty calculator 30 calculates a PWM duty by making PI control calculation, the PWM duty can be appropriately calculated with respect to changes in the target value outputted from the response characteristic adjustor 27.

The present disclosure is not limited only to the embodiments described above or illustrated in the attached drawings, and the following modifications or extensions are possible.

The upper limit value of the PWM duty is not limited to 100% and may be changed as appropriate, for example, to 90% or 80% according to the specifications of individual products.

The parameter used to estimate the maximum rotational speed of the motor 14 need not necessarily be the "current PWM duty." For example, the value of current supplied to the motor 14 via the inverter circuit 3 or the temperature of the inverter circuit 3 or motor 14 may be used as an alternative parameter. Or, a table used to determine a value for rotational speed restriction with respect to the supply voltage may be used as a parameter.

The rotational speed (response characteristic) to be set in the response characteristic adjuster 27 for addition or subtraction every control period is not limited to 400 rpm/ms and may be set as appropriate in accordance with individual designs involved. Also, the response characteristic adjuster 27 may be omitted.

The PWM duty calculator 30 need not necessarily make PI control calculation.

The present disclosure may be applied to a drive control device using a position sensor.

While only the selected exemplary embodiments and examples have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments and examples according to the present disclosure is provided for illustration only, and not for the purpose of limiting the disclosure as defined by the appended claims and their equivalents.

The invention claimed is:

1. A motor control device comprising:
   a rotational speed command output unit that receives and outputs a command value of a rotational speed of a motor inputted from outside;
   a motor rotational speed meter that measures an actual rotational speed of the motor;
   a PWM duty calculator that calculates a PWM (Pulse Width Modulation) duty of a PWM signal based on the command value and the actual rotational speed measured by the motor rotational speed meter; and
   a maximum speed estimator that estimates, based on the actual rotational speed measured, a parameter representing a controlled state of the motor and a predetermined upper limit of the PWM duty, a maximum rotational speed of the motor to be reached under PWM control with the upper limit of the PWM duty, wherein
   the command value inputted from outside is restricted not to exceed the maximum rotational speed,
   the maximum speed estimator estimates the maximum rotational speed of the motor based on a current PWM duty as the parameter representing the controlled state of the motor and using the following formula:

$$(\text{actual rotational speed})/(\text{current PWM duty}) \times (\text{upper limit of PWM duty}), \text{ and}$$

the maximum speed estimator changes the maximum rotational speed of the motor based on a result of the maximum speed estimator.

2. The motor control device according to claim 1, further comprising a response characteristic adjustor that makes adjustment to keep a changing speed of the command value outputted from the rotational speed command output unit equal to or below a predetermined value.

3. The motor control device according to claim 1, wherein the PWM duty calculator calculates the PWM duty by making a PI (Proportional-Integral) control calculation.

4. A motor control method comprising:
   calculating a PWM (Pulse Width Modulation) duty of a PWM signal based on a command value of a rotational speed of a motor inputted from outside and a measured actual rotational speed of the motor;
   based on the measured actual rotational speed, a parameter representing a controlled state of the motor and a predetermined upper limit of the PWM duty, estimating a maximum rotational speed of the motor to be reached under PWM control with the upper limit of the PWM duty; and
   restricting the command value inputted from outside to a value equal to or smaller than the maximum rotational speed, wherein
   the estimating estimates the maximum rotational speed of the motor based on a current PWM duty as the parameter representing the controlled state of the motor and using the following formula:

$$(\text{actual rotational speed})/(\text{current PWM duty}) \times (\text{upper limit of PWM duty}), \text{ and}$$

the maximum speed estimator changes the maximum rotational speed of the motor based on a result of the maximum speed estimator.

5. A motor control device, comprising:
   a rotational speed command output unit that receives and outputs a command value of a rotational speed of a motor inputted from outside;

a motor rotational speed meter that measures an actual rotational speed of the motor;

a PWM duty calculator that calculates a PWM (Pulse Width Modulation) duty of a PWM signal based on the command value and the actual rotational speed measured by the motor rotational speed meter;

a maximum speed estimator that estimates, based on the actual rotational speed measured, a parameter representing a controlled state of the motor and a predetermined upper limit of the PWM duty, a maximum rotational speed of the motor to be reached under PWM control with the upper limit of the PWM duty; and a command value restrictor that, based on the command value outputted from the rotational speed command output unit and the maximum rotational speed estimated by the maximum speed estimator, restricts the command value to a value equal to or smaller than the maximum rotational speed and outputs the restricted command value as a target value to the PWM duty calculator, wherein the PWM duty calculator, using the target value outputted from the command value restrictor as the command value, calculates the PWM duty based on the command value and the actual rotational speed, the maximum speed estimator estimates the maximum rotational speed of the motor based on a current PWM duty as the parameter representing the controlled state of the motor and using the following formula:

(actual rotational speed)/(current PWM duty)×(upper limit of PWM duty), and the maximum speed estimator changes the maximum rotational speed of the motor based on a result of the maximum speed estimator.

6. The motor control device according to claim 1, wherein when the command value inputted from outside is greater than the maximum rotational speed estimated by the maximum rotational speed estimator based on the actual rotational speed measured by the motor rotational speed meter, the command value is restricted to be equal to the maximum rotational speed estimated and the PWM duty is set to the upper limit.

7. The motor control method according to claim 4, wherein when the command value inputted from outside is greater than the maximum rotational speed estimated by the estimating based on the measured actual rotational speed, the restricting restricts the command value to be equal to the maximum rotational speed estimated, and the calculating sets the PWM duty to the upper limit.

8. The motor control device according to claim 5, wherein when the command value inputted from outside is greater than the maximum rotational speed estimated by the maximum rotation speed estimator based on the actual rotational speed measured by the motor rotational speed meter, the command value restrictor restricts the command value to the value equal to the maximum rotational speed estimated and PWM duty calculator sets the PWM duty to the upper limit.

9. The motor control device according to claim 1, wherein the rotational speed meter measures edge intervals of a zero-crossing timing signal, which correspond to the zero-crossing points of induced voltages in stator windings of the motor, to measure the actual rotational speed of the motor.

10. The motor control method according to claim 4, wherein measuring edge intervals of a zero-crossing timing signal, which correspond to the zero-crossing points of induced voltages in stator windings of the motor, to measure the actual rotational speed of the motor.

11. The motor control device according to claim 5, wherein the rotational speed meter measures edge intervals of a zero-crossing timing signal, which correspond to the zero-crossing points of induced voltages in stator windings of the motor, to measure the actual rotational speed of the motor.

\* \* \* \* \*